Dec. 23, 1969 J. E. LINDBERG ET AL 3,485,101

CONTINUOUSLY SUPPORTED SENSOR

Filed Feb. 13, 1968

INVENTORS
JOHN E. LINDBERG
LESLIE J. COOK
KENNETH C. COOK

BY Owen, Wickersham & Erickson

ATTORNEYS

`United States Patent Office`

3,485,101
Patented Dec. 23, 1969

3,485,101
CONTINUOUSLY SUPPORTED SENSOR
John E. Lindberg, Lafayette, Leslie J. Cook, Berkeley, and Kenneth C. Cook, Walnut Creek, Calif., assignors to John E. Lindberg, Lafayette, Calif.
Filed Feb. 13, 1968, Ser. No. 705,086
Int. Cl. G01k *1/08, 3/00, 7/00*
U.S. Cl. 73—343     15 Claims

ABSTRACT OF THE DISCLOSURE

A device for temperature detection and the like, comprising an elongated wire-like sensor and an elongated wire-like protecting and supporting member wound around each other helically at the same pitch, the amplitude of the sensor's helix being smaller than the amplitude of the helix of the supporting member. The support member may have an insulating covering and may be tubular to provide a return path for a wire leading from one end of the sensor.

---

This invention relates to a continuously supported sensor for temperature detection and the like.

One of the problems in fire detection systems and in other temperature detection systems and in some other sensing apparatus has been to provide adequate support and protection for a continuous-type sensor. The sensors themselves are preferably quite small in diameter and need protection. Also they have to be secured at intervals to some main structure, and when they have been directly attached to the walls of an aircraft engine nacelle, vibration has tended to damage them. Special electrical insulation has often had to be provided. Often, they have had to be exposed to positions where if unprotected they could be accidentally severed or otherwise damaged.

In one of the better support systems heretofore in use the temperature detecting sensor was surrounded by a generally tubular perforate shield. Spaced apart sensor supports were provided at intervals inside the tubular shield, and slots and gaps through the shield enabled access of the heat or flame to be sensed. Though this device has many good points, the system had the disadvantage of considerably slowing the time of response by the sensor to a rapid increase in temperature. Such requirements of the United States Government as those of the Federal Aviation Authority FAA–TSO C 11 D or the military specification MIL–F–7872B have been difficult to meet, because the shield kept heat away from the sensor inside it as a side effect of the intentional shielding from physical damage. For example, one response requirement is a response time of five second or less when the complete element (the shield being included if there is one) has a six-inch length exposed to a temperature of 2000° F. Another such requirement is a response time of ten seconds or less at 1500° F. for the same six-inch length. Many prior art devices have been unable to respond within two or three times the prescribed period and the very best ones, which were capable of excellent performance if unshielded, were kept close to the border line by such shielding and support systems. Yet without such protection and support, they were subject to damage and were therefore often unacceptable without some such shielding.

Moreover, prior-art support and shielding systems were often complex or were expensive enough to add greatly to the cost of the complete system. Another, and in many ways better system comprised a spiral winding of the sensor around and upon a support member. The support member was typically considerably larger in diameter than the sensor and gave adequate support and generally good results. The undesirable thing about this particular combination—and it had many good features—was that it required a very long sensor, since the sensor had to be wound helically at fairly close pitch in order to be exposed to all directions of heat. This meant that in a path of given length, the sensor was typically three or four times as long as the length of the path. As a result, the disadvantages of expense and excessive material were accompanied by a tendency to slow the response time of the sensor to short and rapidly applied high temperatures occupying a very small proportion of the path.

An important object of the present invention is to provide a supporting structure for a continuous-type sensor for temperature detecting and the like, such that the supporting structure safeguards the sensor without drastically reducing the sensor's response time.

Another object of the invention is to provide an essentially continuous support for a temperature-detecting sensor, by which the sensor is, in effect, supported by a line contact over its full length. As a result, the vibration characteristic, strength and rigidity of the sensor itself become less important compared to the characteristics of the supporting member, which can be made larger and stronger to provide adequacy.

Another object of the invention is to provide a sensor support structure which exposes the sensor to atmospheric temperature from all directions, so that the heat can come from practically any direction.

Another object of the invention is to provide a sensor support structure in which the sensor can extend along a path without being greatly in excess of the length of the path and also can at the same time be enough in excess to prevent breakage due to tensile and compressive forces which would break completely straight sensors that were already at their maximum extension in the path.

Another object of the invention is to enable disposition of the sensor in such a way that some areas can be given more sensor length to act upon than other areas where the path is of equivalent length. For example, in fire detection there are some critical locations where fires are more likely to break out than others and it may be that it will be desirable to put a larger proportion of the sensor there than in other locations along the same path.

In this invention, an elongated wire-like sensor and an elongated wire-like protecting and supporting member are wound around each other helically at the same pitch, the amplitude of the sensor's helix being smaller than that of the supporting member. By amplitide is meant the radial distance of the outer periphery of the helix from its longitudianal axis. The support member is preferably larger in diameter than the sensor and may be wound about a cylindrical axis or core that is smaller in diameter than the diameter of the sensor; in fact the diameter of the cylindrical axis may be substantially zero. The support member may be coated with heat-insulation material or the sensor may itself be wound with wire substantially smaller in diameter than the sensor, to separate the sensor from the support member, the helix of this wire being of much smaller pitch than the helices of the sensor and support member. The support member may be a tube and contain an insulated return wire leading from one end of the sensor.

Other objects and advantages of the invention will appear from the following description of some preferred embodiments.

Figure 1:
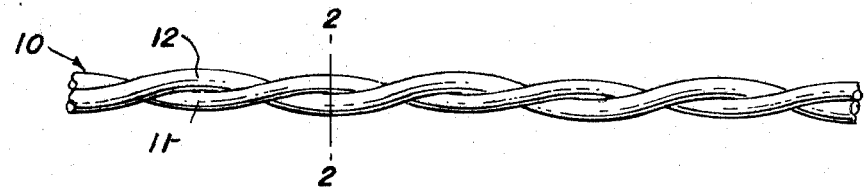
FIG. 1 is an enlarged view in elevation and in section of a portion of a temperature detection device embodying the principles of the invention.
Figure 2:
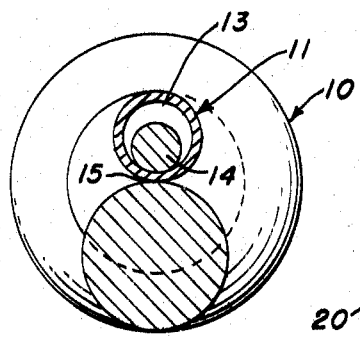
FIG. 2 is an enlarged view in section taken along the line 2—2 in FIG. 1.

A temperature detection device 10 embodying the principles of the invention is shown in FIG. 1 and comprises a sensor 11 helically intertwined with a support member 12. The sensor 11 may be of the type described and claimed in my U.S. Patent No. 3,195,121, or may be of some other type. It may have an open passage 13 enclosing gas to sense the average temperature of its length, or it may have a gas-emitting material 14 inside to sense discrete peak temperatures, or it may be a combination of the two, as shown in FIG. 2. The support member 12 may be a solid member as shown in this view, or it may be tubular (see FIG. 4). The two wire-like members 11 and 12 are wound together helically at the same pitch and providing a helical line contact 15 between them. The support member 12 is preferably larger and stronger and enables the combination to carry more load and to resist vibration better. The pitch is large in comparison with the diameter of either of the sensor 11 or the support member 12, preferably being several times as great. Also, the inner diameter of the helix described by the support member 12 is preferably approximately zero, necessitating the winding of the sensor 11, and at least is smaller than the sensor 11, so that there is an intimate winding relationship. The helically wound support member 12 supports the helically wound sensor 11 throughout its entire length. Because the support 12 has only tangential contact with the sensor 11, the sensor has a rapid response time with minimal heat transfer between the support element 12 and the sensor 11. Direct heating of the sensor 11 through a large amount of its surface is obtained irrespective of the direction of heat impingement. The sensor 11 may be relatively short, as compared with a device where the sensor is wound helically about a straight rigid support member, which is not itself helical, and the shortness of sensor length enables shorter response times. The configuration of the helix of the support member 12 with essentially zero diameter cylindrical axis causes the sensor 11 to wind helically, and thus prevents breakage from tensile and compressive forces which break a straight sensor.

Figure 3:
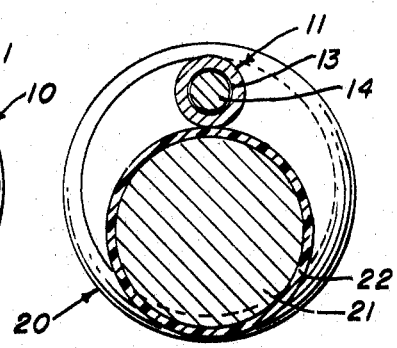
FIG. 3 is a view similar to FIG 2 of a modified form of the invention.

FIG. 3 shows a modified form of the invention wherein the assembly 20 includes a support member 21 that is coated with insulation material 22, such a Kapton tape, glass sleeving, ceramic or porcelain coatings, or other suitable heat-resistant coatings, either singly or in combination. The material from which the support member 21 and sensor 11 are made depends upon the uses involved. Preferably, coefficients of thermal expansion are matched. However, this is not always necessary. A typical material for the sensor 11 is stainless steel. Another one is molybdenum, and the support member may be made from these same materials.

Figure 4:
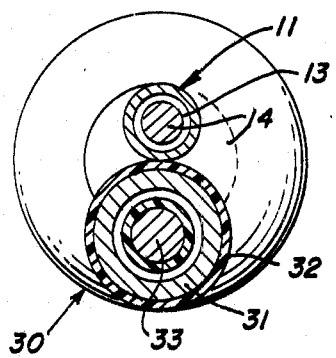
FIG. 4 is another view similar to FIG. 2 of another modified form of the invention.

As shown in FIG. 4, the combination 30 may include a support member 31 which is tubular, is covered with insulation 32 and contains an insulated wire 33 which is a return wire from one end of the sensor 11 to the other. This is good where some return element is required, and it minimizes the space necessary for the use of such elements.

Figure 5:
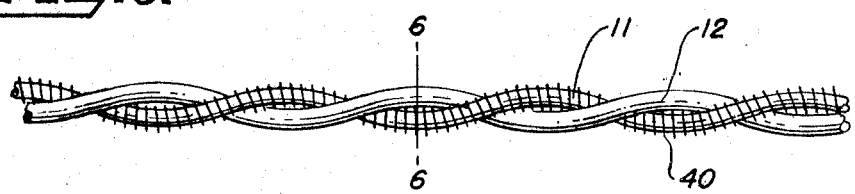
FIG. 5 is a view similar to FIG. 1 of another modified form of the invention.
Figure 6:
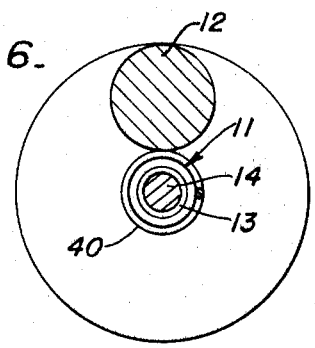
FIG. 6 is an enlarged view in section taken along the line 6—6 in FIG. 5.

As shown in FIGS. 5 and 6, the sensor 11 may be wound itself with a much smaller pitch helix of small wire 40, which serves to prevent the line contact and provides only occasional point contact while giving substantially the same degree of support. The line contact is the very small wire, and the total area obscured in this manner is often less than in the other forms shown. The sensor 11 and the support structure 12 may have resilient oxide coatings on them as provided for in earlier patents, if that is desired.

The savings in weight per unit brought about by this invention through reduction of support size and shorter sensors help to reduce the manufacturing cost of the item.

Various pitches of the support spiral have been fabricated and tested and it has been found that with pitches greater than about 0.45″, the response rates are definitely less than five seconds when six inches of support is exposed to an FAA standard test burner.

Also, vibration tests have shown that mountings directly on the structure with metal clamps or with vibration dampener inserts have been satisfactory up to at least twenty G's of force with amplitudes of vibration up to 0.036″ through zero to 1,000 cycles per second. Molybdenum disulfide has been applied to the outer surface of the support member 12 and sometimes the sensor 11 too as an antifriction lubricant, and this has been effective in reducing wear between the support clamp and the members and between the support member and the sensor.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A device for temperature detection and the like, including in combination:
 an elongated wire-like sensor, and
 an elongated wire-like protecting and supporting member,
 both said sensor and said member being wound around each other helically at the same pitch, the amplitude of the sensor's helix being smaller than the amplitude of the member's helix.

2. The device of claim 1 wherein said member is larger in diameter than said sensor.

3. The device of claim 1 wherein said sensor is hollow tube enclosing gas.

4. The device of claim 1 wherein said sensor is a hollow tube containing a gas-emitting material for sensing discrete peak temperatures.

5. The device of claim 1 wherein said member is coated with heat-insulation material.

6. The device of claim 1 wherein said sensor is itself wound with wire substantially smaller in diameter than said sensor, serving to separate said sensor and said member, the helix of said wire being of much smaller pitch than the helices of said sensor and said member.

7. The device of claim 1 wherein said member is a tube and contains and is insulated from a return wire from one end of said sensor.

8. The device of claim 1 wherein said member is wound about a cylindrical axis that is smaller in diameter than said sensor.

9. The device of claim 8 wherein the diameter of the cylindrical axis is substantially zero.

10. A temperature detection device comprising a wire-like hollow tubular sensor containing gas, and a wire-like support member helically intertwined with line contact between them.

11. The device of claim 8 wherein said support member is larger in diameter than said sensor and of superior strength.

12. The device of claim 10 wherein said support member is coated with heat-insulation material.

13. The device of claim 10 wherein said support member is a tube and a return wire leading from one end of said sensor inside said tube and insulated therefrom.

14. The device of claim 8 wherein said tubular sensor contains a gas-emitting material for sensing discrete peak temperatures.

15. A temperature detection device comprising a wire-like sensor and a wire-like support member helically intertwined with line contact between them, said support member being a tube, and a return wire leading from one end of said sensor inside said tube and insulated therefrom.

References Cited

UNITED STATES PATENTS 2,456,617 12/1948 Burch _____ 73—295
2,518,789 8/1950 Jackson _____ 200—143

LOUIS R. PRINCE, Primary Examiner

WILLIAM A. HENRY II, Assistant Examiner

U.S. Cl. X.R.

73—368